UNITED STATES PATENT OFFICE.

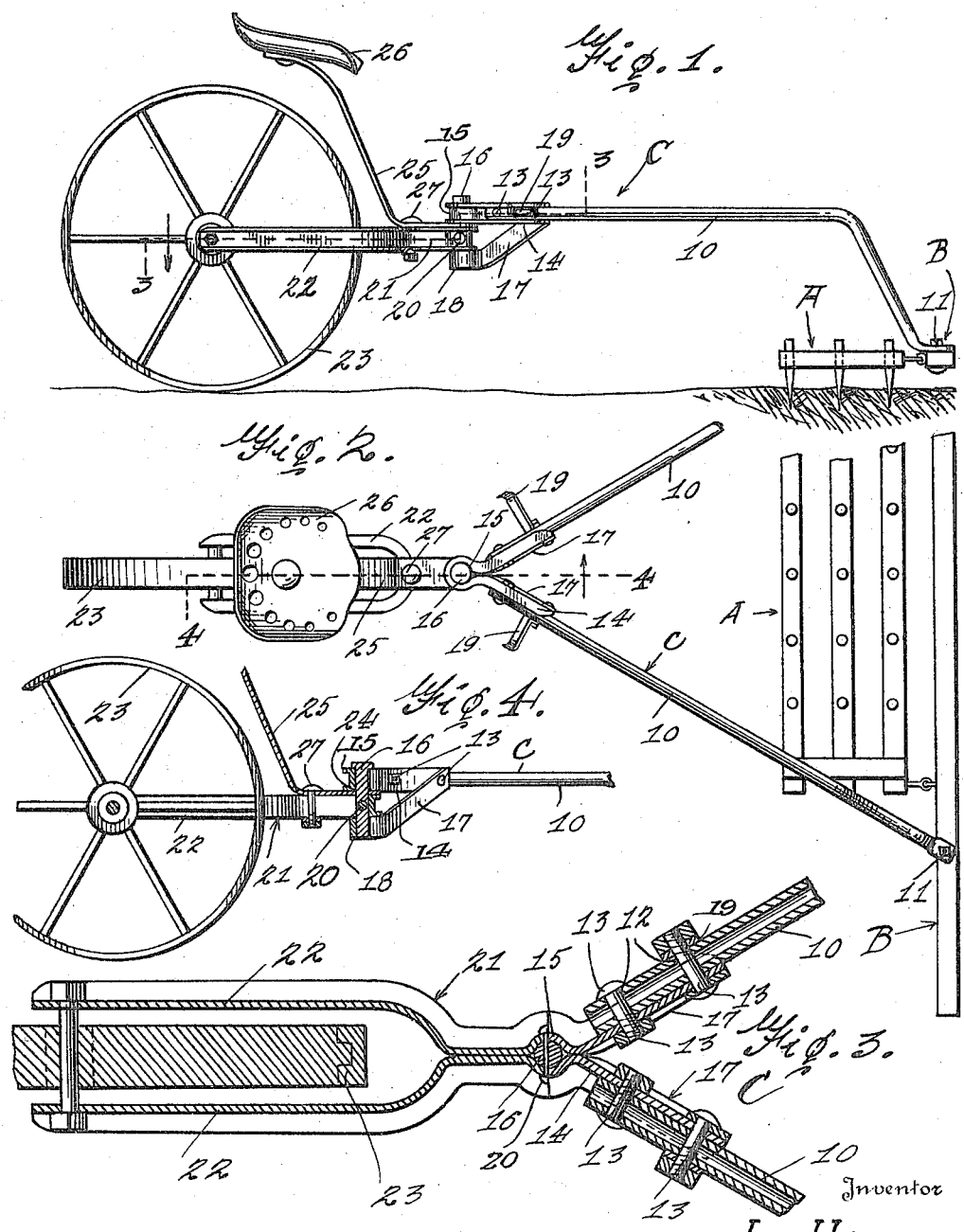

LEVI HANSON, OF GILDFORD, MONTANA.

RIDING ATTACHMENT FOR HARROWS.

1,187,907. Specification of Letters Patent. Patented June 20, 1916.

Application filed April 7, 1915. Serial No. 19,803.

*To all whom it may concern:*

Be it known that I, LEVI HANSON, a citizen of the United States, residing at Gildford, in the county of Hill, State of Montana, have invented certain new and useful Improvements in Riding Attachments for Harrows; and I do hereby declare the following to be a full, clear, and exact description of the invention, such as will enable others skilled in the art to which it appertains to make and use the same.

This invention relates to riding attachments for harrows, and more particularly to a device that is applicable to harrows of ordinary construction whereby the operator is enabled to ride in the rear of the harrow instead of walking as is usually the case.

An object of the invention resides in the provision of an attachment of the above character in which the seat is so disposed with relation to the harrow, that transmittal thereto of motion laterally of the direction of travel, due to passage of the implement over rough or freshly plowed surfaces, will be minimized.

A further object of the invention is to improve and simplify the construction of such attachments, while at the same time reducing to a material degree, the cost of production thereof.

With the above and other objects of similar nature in view, the invention consists in the construction, combination and arrangement of parts, set forth in and falling within the scope of the appended claim.

In the drawing:—Figure 1 is a side elevation of a harrow with the invention applied. Fig. 2 is a top plan view thereof. Fig. 3 is a fragmentary sectional view taken on the line 3—3 of Fig. 1, and Fig. 4 is a similar view taken on the line 4—4 of Fig. 2.

Referring now more particularly to the accompanying drawing, there is illustrated a harrow A of ordinary construction including the usual draw bar B with which the attachment C is adapted to be engaged. In detail, the attachment C comprises a pair of spaced attaching bars 10 that are secured as at 11 to the draw bar B and extend upwardly and rearwardly therefrom in convergent relation, said bars being each provided adjacent its rear end with transverse openings 12 through which bolts 13 are removably engaged. Connecting the rear ends of the bars 10 is a substantially V-shaped member 14 constructed preferably of channel iron with the channel thereof opening outward, the arms of said member respectively receiving the related bar within the channel, and being secured thereto by means of the bolts 13. This member 14 is further formed at its apex with a pivot bolt receiving eye 15 that opens vertically of the member and receives for pivotal movement the upper end of a pivot bolt 16.

Secured by corresponding bolts 13 to the arms of the connector 14 is a combined brace and bearing member 17, which is formed preferably of a single length of metal intermediately bent to provide an eye 18 disposed below and in spaced relation to the eye 15 of the connector whereby to provide a bearing for the lower end of the pivot bolt 16. Also carried by the bolts 13 and extending outwardly of the bars 10 are suitable foot rests 19, the purpose of which will presently be apparent.

Mounted for pivotal movement between the bearing eyes 15 and 18 and fixed to the bolt 16 by means of a transverse pin 20 is a U-shaped supporting frame 21, likewise constructed of channel iron and including spaced longitudinally extending legs 22, there being journaled between said legs a supporting or caster wheel 23.

Engaged upon the supporting frame 21 and apertured as at 24 to receive the pivot bolt 16, is a seat bar 25, which supports at its upper end a seat 26, said bar being secured to the frame by means of a bolt 27 and adapted for movement therewith relatively of the harrow, during passage of the latter over the ground.

From the foregoing it will be observed that there has been provided an attachment of the character specified which may be conveniently applied to a harrow or other similar implement and provides improved means whereby the operator may ride in the rear of said implement instead of walking as is usually the case. It will further be noted that by mounting the seat 26 upon the frame 21 so that same is movable with the latter relatively of the harrow, transmittal thereto of motion laterally of the direction of travel, due to sidewise jerks of the harrow when passing over rough or freshly plowed surfaces, will be minimized, thereby rendering to the attachment the maximum degree of safety and easy riding.

What is claimed, is:—

A riding attachment for harrows including divergent attaching bars, a substantially V-shaped member connecting said bars and having in its apex a bolt receiving eye, a substantially V-shaped brace secured with its legs to the connecting member and provided with an eye in its apex disposed below and in registration with the first named eye, a bolt pivotally engaged through said eye, a caster wheel including a frame pivotally supported between said eyes and engaged with the bolt, and a seat supported on said frame.

In testimony whereof, I affix my signature, in the presence of two witnesses.

LEVI HANSON.

Witnesses:
D. A. Crites,
V. V. Smith.

Copies of this patent may be obtained for five cents each, by addressing the "Commissioner of Patents, Washington, D. C."